J. W. HILTON & R. W. GREEN.
AXE.

No. 81,635. Patented Sept. 1, 1868.

Witnesses:
Wm. A. Morgan.
G. E. Cotton.

Inventors:
J. W. Hilton.
R. W. Green.

per Munn
Attorneys

United States Patent Office.

J. W. HILTON AND R. W. GREEN, OF BRADFORD, PENNSYLVANIA.

Letters Patent No. 81,635, dated September 1, 1868.

IMPROVEMENT IN AXES.

*The Schedule referred to in these Letters Patent and making part of the same.*

TO ALL WHOM IT MAY CONCERN:

Be it known that we, J. W. HILTON and R. W. GREEN, of Bradford, in the county of McKean, and State of Pennsylvania, have invented a new and useful Improvement in Axes; and we do hereby declare that the following is a full, clear, and exact description thereof, which will enable others skilled in the art to make and use the same, reference being had to the accompanying drawings, forming part of this specification, in which—

Similar letters of reference indicate like parts.

Figure 1:
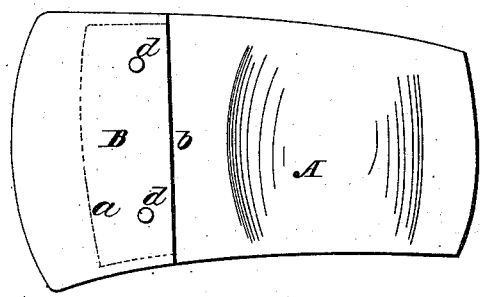
Figure 1 is a side view of our improved axe.

The object of this invention is to provide an axe with a separate and removable cutting-edge, whereby the latter may be readily removed, when rendered unfit for further use, from wear or otherwise, and a new cutting-edge substituted therefor, thus saving the poll or main body of the axe.

In the drawings, A is the poll, which is formed with a tapered tongue or tenon, $a$, (shown dotted in figs. 1 and 2,) having shoulders $b$.

The steel edge, B, is formed with a corresponding recess, to receive the tenoned part of the poll. Dowels $d\ d$ pass through the two parts, and thus hold them securely together.

In practice, these dowels may be replaced by screws, if desirable.

Figure 2:
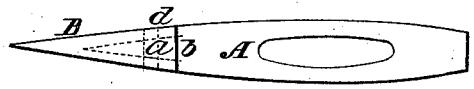
Figure 2 is an end view of the same.

In figs. 1 and 2, the tenon is formed with a shoulder on all of its sides, the recess or cavity of the edge being correspondingly enclosed, thus forming a tapering mortise.

Figure 3:
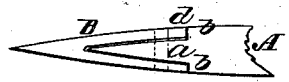
Figure 3 is a detail view of a modification of our feature of improvement.

In fig. 3, a modification of the same feature is shown, where the tenon has no lateral shoulders, being flush with the breadth of the axe.

The recess in the part B is merely a V-shaped slot or channel, extending through the entire breadth of the said part, as shown.

The two parts are constructed to fit snugly together, and when once so fitted are as solid as an axe formed of a welded edge.

Having thus described our invention, we claim as new, and desire to secure by Letters Patent—

As a new article of manufacture, a chopping-axe, having a removable edge, when the two parts A and B, composing said axe, are constructed substantially as and for the purpose shown and described, and secured together by removable dowels $d\ d$, all as set forth.

J. W. HILTON,
R. W. GREEN.

Witnesses:
 E. B. WINGATE.
 G. I. FRANK.